United States Patent
Dowdal et al.

(10) Patent No.: US 7,177,306 B2
(45) Date of Patent: Feb. 13, 2007

(54) CALCULATION OF CLOCK SKEW USING MEASURED JITTER BUFFER DEPTH

(75) Inventors: John Thomas Dowdal, Gaithersburg, MD (US); Qin Su, Gaithersburg, MD (US)

(73) Assignee: Texas Instruments Incorporated, Dallas, TX (US)

( * ) Notice: Subject to any disclaimer, the term of this patent is extended or adjusted under 35 U.S.C. 154(b) by 1038 days.

(21) Appl. No.: 10/259,735

(22) Filed: Sep. 30, 2002

(65) Prior Publication Data

US 2004/0062252 A1    Apr. 1, 2004

(51) Int. Cl.
 *H04L 7/02* (2006.01)
(52) U.S. Cl. .................. 370/356; 370/517; 375/371
(58) Field of Classification Search ............. 370/356, 370/517, 518; 375/371
See application file for complete search history.

(56) References Cited

U.S. PATENT DOCUMENTS

| | | | |
|---|---|---|---|
| 5,790,538 A | 8/1998 | Sugar | 370/352 |
| 5,859,881 A * | 1/1999 | Ferraiolo et al. | 375/350 |
| 7,006,510 B2 * | 2/2006 | Wei | 370/412 |
| 7,092,365 B1 * | 8/2006 | Tackin et al. | 370/286 |

* cited by examiner

*Primary Examiner*—Melvin Marcelo
(74) *Attorney, Agent, or Firm*—Steven A. Shaw; W. James Brady; Frederick J. Telecky, Jr.

(57) ABSTRACT

A system and method to measure the clock skew between transmitting and receiving devices operating with independent clock sources over a packet network is described. To provide adaptive playout in an IP telephony device without a sequencing scheme in the packets, the clock skew is measured and recorded. Using a PCM resampler that is implemented with an interpolation filter bank of FIR sub-filters, the change in depth of the playout buffer during transmission is analyzed, and this change infers the clock rate associated with the transmission.

9 Claims, 3 Drawing Sheets

CALCULATION OF CLOCK SKEW USING MEASURED JITTER BUFFER DEPTH

CROSS-REFERENCE TO RELATED APPLICATIONS

None

FIELD OF THE INVENTION

The present invention relates to a system for measurement of clock skew in an packet network for use with data transmissions between transmitting and receiving units having independent clocks.

BACKGROUND OF THE INVENTION

The quality of service of realtime voice and video communication data transmissions over packet-switched networks, such as the Internet, is typically compromised by packet transmission delay and jitter that are inherent to an IP network. Achieving high-quality transmissions between two or more ports of isochronous, asynchronous, and plesiosynchronous data is critical for voice, video, and data communications all over the world.

Network protocols permit data, voice, and video communications to be digitized and transmitted via packets in a network system. Voice over packet networks, or VoIP, requires that the voice or audio signal be packetized and then transmitted. The transmission path will typically take the packets through both packet switched and circuit switched networks between each termination of the transmission. The analog voice signal is first converted to a digital signal and compressed at a gateway connected between a terminal equipment and the packet network. The gateway produces a pulse code modulated (PCM) digital stream from the analog voice.

To transmit the digitized data within packets between communication ports, receiving and transmitting systems are needed. Typically, the receiving and transmitting systems are modems, telephones, or other communication ports. A receiving and transmitting system typically supports independent clocks which have matched frequencies in order to minimize loss of data and/or synchronization. Packets are routed through the packet network based upon the IP address information. The packet may pass through several switches and routers and the signal in digital and analog form and may pass through both packet switches and circuit switches respectively. The packets are likely to accumulate delay as they pass between the near and far end terminal equipment, through the near and far end gateways, through the packet and PSTN networks and through switches.

Because this accumulated delay is erratic and unpredictable and further because each packet may take a different path through the networks, delay can cause the packets to arrive out of sequence and/or with gaps or overlaps. Gapping and overlapping of packets is referred to as delay and the variance in delay from one packet to the next is called jitter. Delay and jitter are measured by comparison of the end time stamp of one packet with the start time stamp of the next packet. If the next packet is received before the end time stamp of the previous packet, there is overlapping delay. If the latest packet is received after the end time stamp of the current packet, the difference in the time is the delay gap. Conditions in the packet network can also cause the loss of packets, referred to as packet loss.

One method for removing timing jitter from incoming packets at a receiver is to use a playout buffer. To correct for out of sequence packets, the system may use time identification stamps that are placed into packets at the transmitter. U.S. Pat. No. 5,790,538 describes how the transmitter inserts the contents of a free running packet counter into each transmitted packet, allowing the receiver to detect lost packets and to properly reproduce silence intervals during playout. A last packet reply request is inserted into the buffer if it detects the loss of one or more packets. A receive sequence counter increments at the local packet rate to schedule playouts for multiple voice segments. Upon arrival of the first packet in the voice segment, the system sets the receiving sequence equal to the sequence number of the incoming packet and inserts a delay of several packets into the buffer before inserting the first codeword of the segment. The buffer has a storage device delay that has the effect of centering the buffer in order to smooth out jitter during playout, after which the entire voice segment is played out in a uniform rate.

Using time stamps to transmit packets is dependent upon both receiving and transmitting ends using the same timestamp identifiers and protocols. In addition, not all protocols use timestamps.

SUMMARY

It is a common occurrence to have the receiving system's data clock differ in frequency from the transmitter's clock frequency. This frequency difference, even if minute, is especially a problem during playout of voice packets and voice band data packets. If left unaddressed, this frequency mismatch causes the sample buffer in the receiving unit to overflow or collapse. This in turn results in poor quality voice playout, or in the case of voiceband data, a reset of the modem, or if sending encrypted data, a complete loss of information. As such, packet networks require that the systems be synchronized, or the loss of packets must be tolerated.

A clock frequency recovery is utilized where the receiver clock frequency differs from the transmitter clock frequency. The system increases or decreases the playout rate from the buffer after packets have been re-assembled according to their sequence.

Inside of transmitting and receive IP communication gateways on a network are independent clocks. Often the clocks are implemented at high frequencies that become divided down to 8 kHz. One of the main problems causing synchronisation problems in such a network is that no two clocks have exactly the same frequency. The two different, independent clocks will have a slight error, such as 0.001% which is a low error, but it is still an error. Most Internet telephony communications systems cannot function with greater than a 1% error in clock synchronization. If the receiver has the faster of the two clocks, it will drain a buffer faster causing the buffer to underflow. A slower clock will drain the buffer slower causing the buffer to overflow. Data buffer underflows or overflows can cause the data transmission to drop one or more frames and cause a retrain to occur on modem connections. A typical modem has an approximate 100 ms buffer, so when a clock error between the transmitting and receiving clock reaches 100 ms, the modem may retrain.

The present invention measures the error in a buffer so that data to a resampler can be corrected to compensate for clock errors. A resampler receives data from the buffer and passes the packets through a filter such that the data in the packets will actually match the transmitting clock. A resampler can create or remove data samples and will actually increase or decrease playout speed so that the playout is smooth and the modems will not retrain.

To provide adaptive playout in an IP telephony device without timestamps in the packets, the clock skew between two telephony devices operating from independent clock sources is measured and recorded. Using the PCM resampler of the preferred embodiment, the change in depth of the playout buffer during transmission is analyzed, and this change indicates the difference in clock rate and so infers the clock rate associated with the transmission. If the playout buffer in the near end device grows or shrinks, then the local clock is slower or faster than the far end device clock.

BRIEF DESCRIPTION OF THE DRAWINGS

Preferred embodiments of the invention are discussed hereinafter in reference to the drawings, in which.

DETAILED DESCRIPTION OF THE INVENTION

Figure 1:
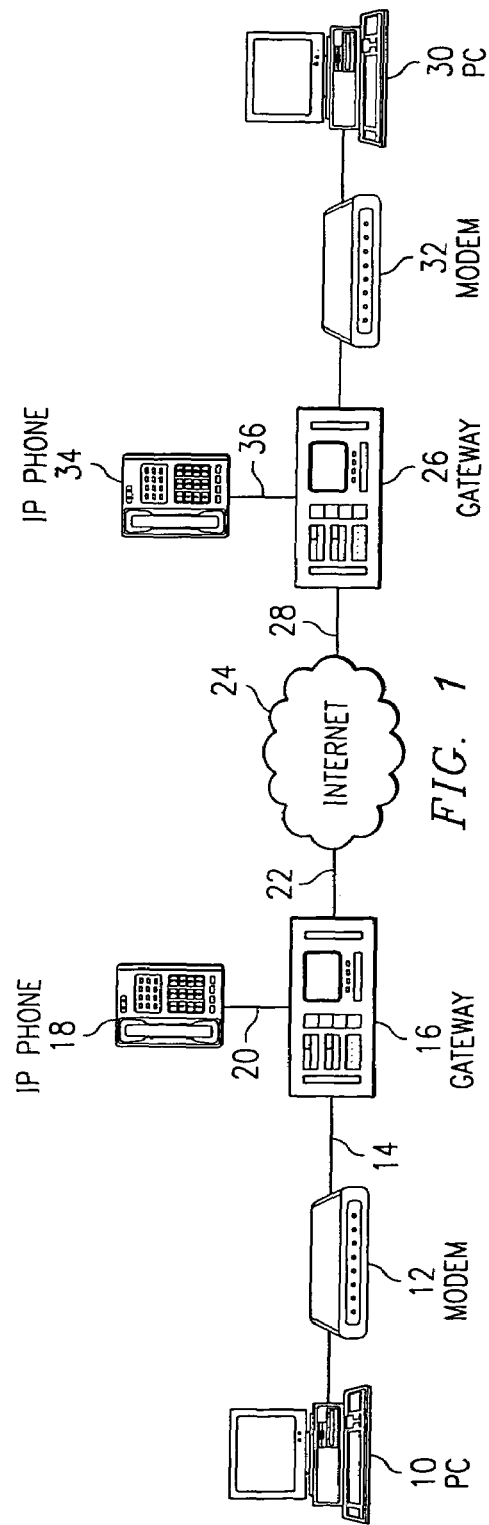
FIG. 1 is a diagram of a network having communication devices transmitting over Internet protocol.

Referring to FIG. 1, a typical packet network utilizing Internet protocol is illustrated. At the near end, a personal computer 10 is connected to gateway 16 through modem 12. Modem 12 connects to gateway 16 through the public switched telephone network (PSTN) 14. An Internet protocol (IP) telephone 18 is also directly connected to communications port on gateway 16 through a network connection 20. Gateway 16 is connected to a packet network, such as the Internet 24 with a broadband or high-speed connection 22 such as a digital subscriber line (DSL) or T1/T5 line. At the far end, a similar network is configured through gateway 26 that is connected to the Internet 24 via a high-speed connection 28. PC 30 is connected to gateway 26 through modem 32, and IP telephone 34 is directly connected to a communication port on gateway 26 through a network connection 36.

The system of the present invention can be implemented on either the near end's gateway 16 alone or both the near and far end 26 gateways. When implemented only on one end, inference must be made regarding the clock on the far end without having any data or specifications regarding the far end clock. A gateway clock that is controlled by a separate system may cause underflows or overflows and retrains for the receiving and transmitting modems, but a near end gateway implementing the present invention will avoid such problems to occur from the near end.

Figure 2:
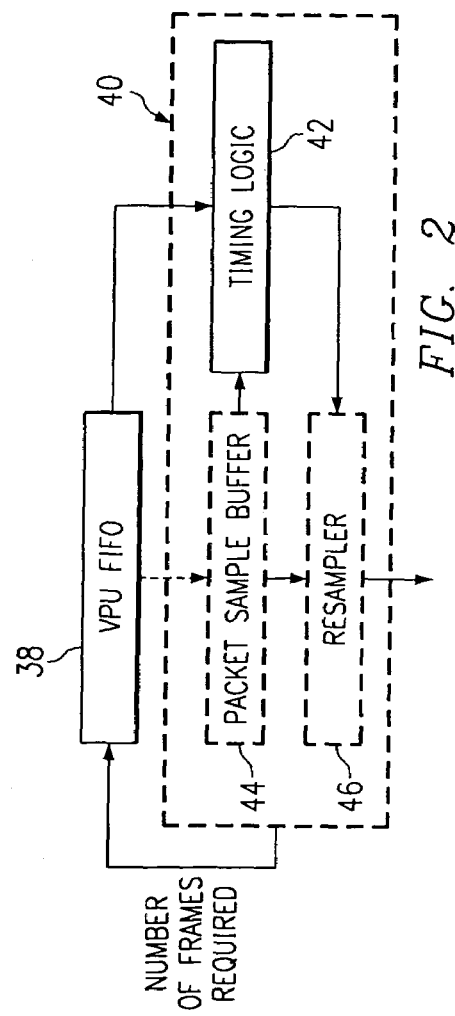
FIG. 2 is a diagram of a the resampling unit of the preferred embodiment.
Figure 3:
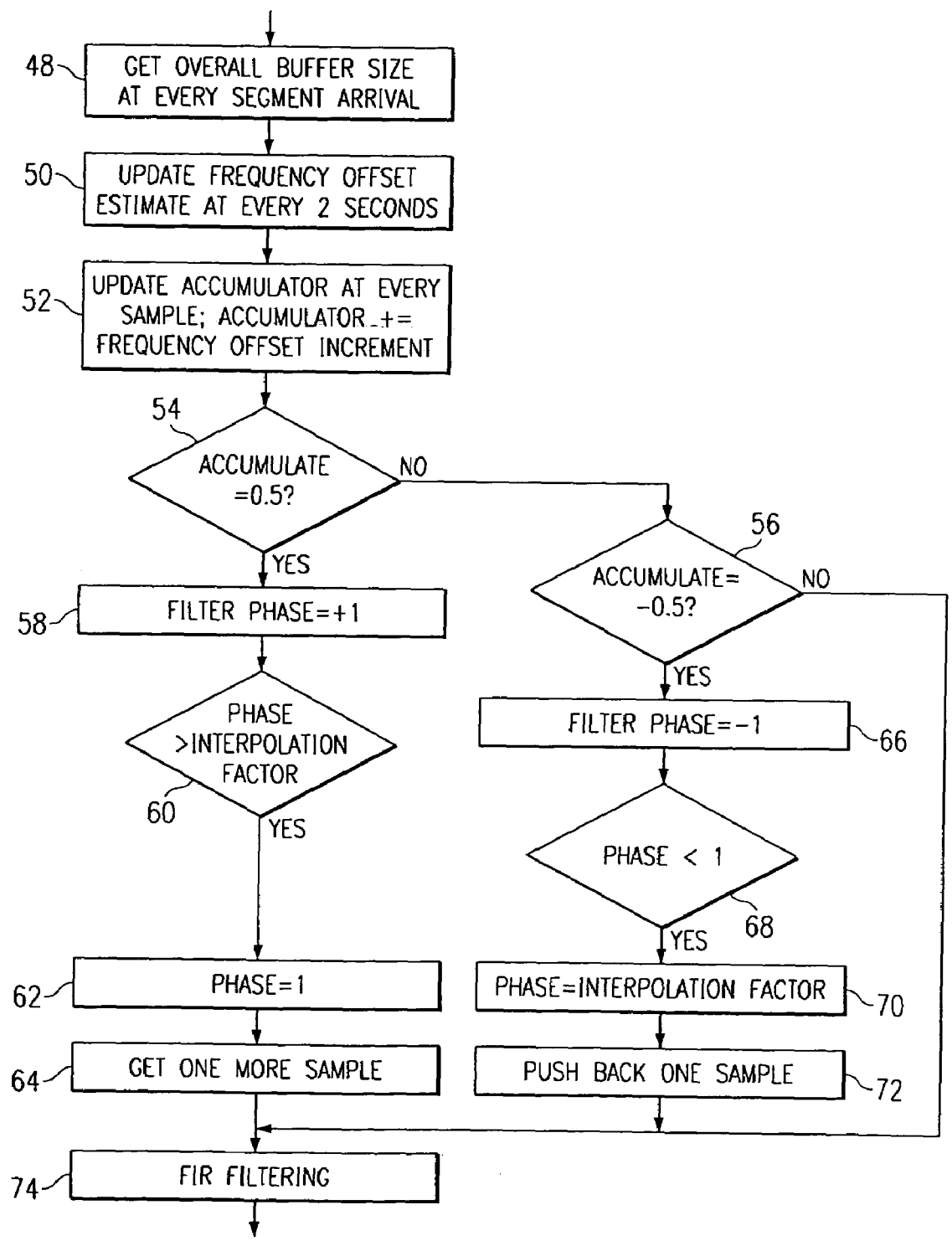
FIG. 3 is a flowchart representing decision steps of the resampling unit.

Referring to FIG. 2, a diagram of the resampler system of the preferred embodiment is illustrated. FIG. 3 also illustrates a flow diagram of the preferred embodiment and is referenced throughout the description. The system is implemented to track frequency offsets between a transmitter's nominal 8 kHz pulse code modulation (PCM) clock and a local receiver's nominal 8 kHz playout clock. The resampler system comprises a Voice Playout Unit (VPU) 38 having a First In First Out (FIFO) playout buffer and a Resampler Unit (RSU) 40 comprising Timing Logic module 42, a packet sample buffer 44 (RSU buffer) and a resampler 46.

The RSU 40 sits on the communications receiver side only. RSU 40 receives one frame of data at the transmitter's clock rate and sends out one frame of re-sampled data at the receiver's clock rate. A FIFO is a storage method that retrieves items stored the for longest time first. The VPU playout buffer 38 is a buffer that contains the resampled data. The VPU playout buffer size serves as the input to Timing Logic 42. RSU packet sample buffer 44 is a temporary storage for received packets prior to sending them to the resampler. A buffer is used in a protocol to reduce variances in gaps between packets in a receiver, making the total delay a minimum time and increase smoothness in the playout. Sample packets are received into the RSU buffer 44 from the VPU buffer 38 and extracted from the RSU buffer 44 into the resampler 46.

The smoothed overall RSU buffer size $y_n$ is calculated at the arrival of every data segment 48 by adding VPU playout buffer 38 size to the RSU buffer 46 size $x_n$ using the following formula:

$$y_n = \alpha*(x_n - y_{n-1}) + y_{n-1} \text{ where } \alpha = 2^{-10}$$

As the result of using the VPU playout buffer 38 size as the input of Timing Logic 42, the resampler 46 cannot work properly when adaptive playout is enabled. The resampler also cannot function properly when voice activity detection (VAD) is enabled for the communications channel.

Timing Logic 42 generates a timing phase advance/retard signal $\epsilon$ based on the change of the smoothed overall buffer size. The frequency offset estimate of $\epsilon$ is updated over a certain period of time, which should be long enough to minimize the jitter effect and short enough to compensate the worst frequency offset. In the preferred embodiment, $\epsilon$ is updated every two seconds 50 using the following equation:

$$\varepsilon = \varepsilon + \frac{\mu \times (\text{Change in smoothed buffer size}) \times (\text{Interpolation Factor})}{2 \times (\text{Updated interval in samples})}$$

Where $\mu$ is 0.03, Interpolation Factor is 32 and Update interval in samples is 16,000. $\epsilon$ is a fraction much less than 1. However, $\epsilon$ must be large enough to allow the system to track the worst case clock frequency offset. The upper and lower boundaries of $\epsilon$ an be calculated using the following equation as suggested by Anandakumar and McCree:

$$\text{Max } \varepsilon = \frac{0.5 \times \text{Interpolation factor} \times \text{Maximum frequency offset}}{NominalFrequency}$$

Outside of the boundaries established by Max $\epsilon$, the system will not track the clock skew. In the preferred embodiment, the maximum frequency offset is set to 2 Hz.

As the sampling phase is advanced or retarded, samples are removed from the packet buffer either slightly faster or slower. An equilibrium is reached, the transmit and receive clocks are synchronized. To avoid the unstable buffer size effect at the beginning of the connection time, which can cause lower connection rates, the resampler parameters are updated after the first minute.

The resampler is implemented by an interpolation filter bank. The filter bank comprises a set of L number of finite impulse response (FIR) subfilters. The I-th subfilter interpolates between received samples by a time interval of I/L of the sampling period where $0 \leq I \leq L-1$. when the transmitter's and receiver's clocks are synchronized, the same subfilter is used to generate an output sample from the received input sample. Otherwise, the Timing Logic increments or decrements the subfilter index appropriately. Occasionally, the subfilter index will be incremented to L. In this case, an extra sample must be extracted 64 from the sample buffer to be used for the next interpolation and the subfilter index must be reset to 0. Similarly, the index can be decreased to 0. Then a sample must be pushed back 72 to the packet buffer and the subfilter index set to L−1.

To accomplish the above, the sample buffer size must be three times the frame size to backup one extra frame of data and to hold the pushed back samples. This also introduces one frame delay to the system. Most of the time, VPU 38 sends out one segment from playout FIFO every frame time. But when sample buffer size reaches zero, RSU 40 sends a message to VPU through SIU asking for two segments from VPU playout FIFO 38 and when sample buffer size reaches two segments, RSU 40 asks zero segment from VPU 38. In this way, VPU 38 can sends out one, two, or zero segments from playout FIFO each time, as required, to prevent over or under flow. Typically, the frequency offset is very small and infrequent changes to the subfilter index is needed. The timing phase updating mechanism should not cause significant jitter or hunting of the subfilter index. This can be accomplished by the Random Walk filter.

Figure 4:
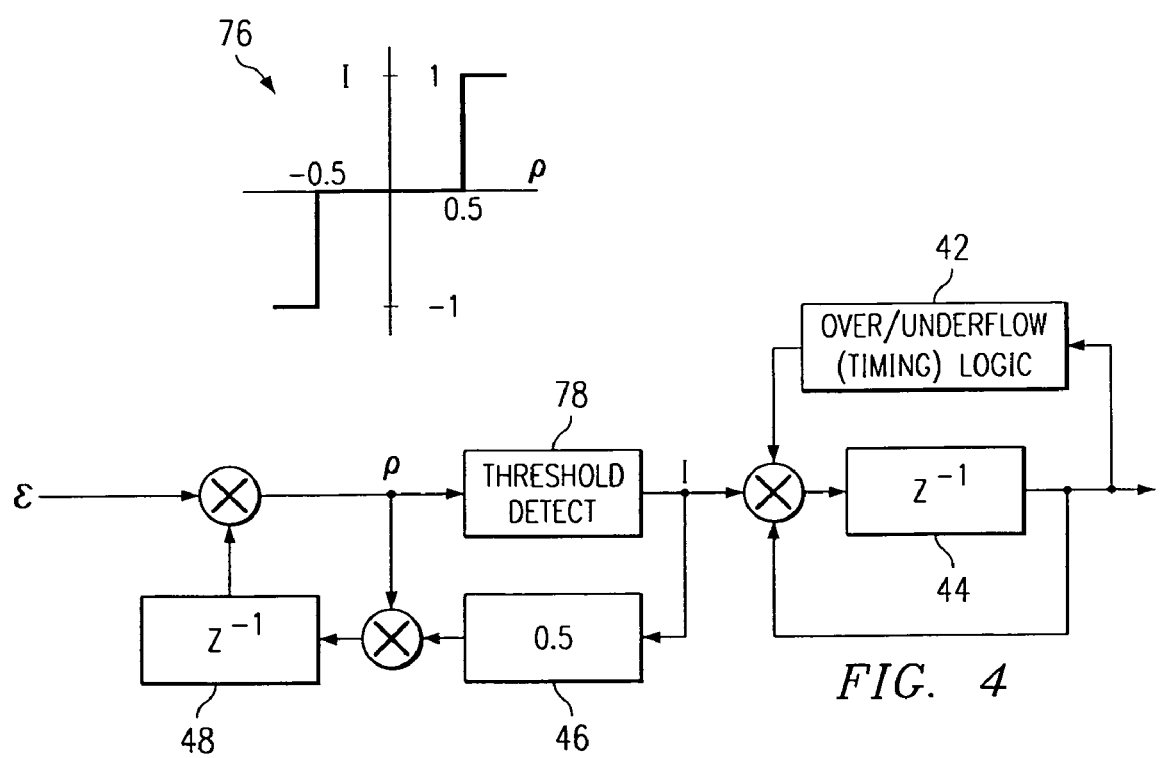
FIG. 4 is a diagram of a Random Walk Filter.

The Random Walk filter (RWF) is illustrated in the block diagram of FIG. 4. The Random Walk Filter establishes the parameters for upsampling or downsampling within the filter bank. Each change between the subfilters will use the RWF to determine if the sample moves to the consecutive upper filter or a consecutive lower filter within the filter bank according to a threshold. Z−1 blocks 44, 48 represent the FIR subfilters in the RSU and Overflow/Underflow logic 42 is the Timing Logic 42 of FIG. 2. As signal $\epsilon$ enters the filter, it is received into the Threshold Detect 78. An accumulator, $\rho$, is updated 52 at every data sample that is passed through the RWF. Most often the Threshold Detect 78 output, I, is 0 since $\rho$ is iterative and accumulated from a very small $\epsilon$. That is, $$\rho = \rho + \epsilon$$

If output $\rho=0.5$ (54) then as shown on graph 76, I=1 (58). The phase is greater than the interpolation factor 60 resulting in a phase=1 (62) and the sample it upfiltered 64. If output $\rho=-0.5$ (56) then according to graph 76, I=0 and the filter phase is equal to −1 (66). Since the phase is less than 1 (68) the phase equals the interpolation factor 70 and the sample is downfiltered 72. In other words, when the Threshold Detect 78 outputs a 1 or −1, the subfilter index increases or decreases by one, respectively. After analysis through the RWF, the sample is then passed to an FIR filter 74 in the subfilter bank 74 of the resampler 46.

The FIR subfilter bank size in the preferred embodiment is 32. However, as one skilled in the art will observe, the filter bank size and specifications could vary without departing from teaching or claims of the present invention. Each filter is linear phase, symmetric, and in the order of 64. The coefficients of each filter can be generated with simulation software. The cutoff frequency of the filter bank is larger than 3800 Hz. The phase shift between the conjunction filters is $(2\pi/8000)/32$.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed is:

1. A system for calculation of clock skew between two communication ports in a packet network, comprising:
   a transmitting unit comprising a transmitting clock
   a receiving unit comprising a playout clock, a FIFO playout buffer, and a resampling unit;
   a packet data stream between the transmitting unit and the receiving unit;
   a packet sample buffer in the resampling unit that receives packet data from the playout buffer and feeds a resampler;
   a timing logic module that generates a timing phase signal based on the size change of the playout buffer combined with the packet sample buffer, where the signal tracks the clock frequency offset between the transmitting and playout clocks;
   a resampler in the sampling unit that resamples the packet data from the sample packet buffer and uses the timing phase signal to advance or retard the sampling phase of a bank of subfilters within said resampler.

2. The system of claim 1, wherein:
   the timing signal is updated over a period of time adequate to minimize a jitter effect and compensate for a worst frequency offset.

3. The system of claim 1 wherein:
   the resampler is an interpolation filter bank of finite impulse response filters, where the filter bank has a subfilter index.

4. The system of claim 3, wherein:
   the timing logic increments or decrements the subfilter index using the Random Walk Filter.

5. A method for calculating clock skew for data transmissions between transmitting and receiving units having independent clocks in a system for voice playout, comprising:
   transmitting data packets from a transmitting unit with an independent clock source;
   receiving the data packets into a FIFO buffer;
   transmitting data packets from the FIFO buffer to a sample packet buffer in a resampler unit;
   generating a timing phase signal to advance or retard sampling based on the change in size of the FIFO buffer combined with the sample packet buffer;
   minimizing jitter effect and compensating clock skew by updating the timing phase signal over time;
   advancing or retarding samples using a Random Walk Filter to upsample or downsample within an FIR subfilter bank of a resampler.

6. The method of claim 5, wherein:
   samples are removed from the sample packet buffer faster or slower as the sampling phase is advanced or retarded.

7. The method of claim 5, wherein:
   resampler parameters are updated at the beginning of a connection period to avoid an unstable buffer size effect.

8. The method of claim 5, wherein:
   the subfilter bank is used to generate an output sample from the received input sample when the transmitting and receiving clocks are synchronized.

9. The method of claim 5, wherein:
   a subfilter index is incremented or decremented according to the Random Walk Filter when the transmitting and receiving clocks are not synchronized.

* * * * *